United States Patent
Tamura et al.

(12)

(10) Patent No.: US 11,296,333 B2
(45) Date of Patent: Apr. 5, 2022

(54) FUEL CELL SYSTEM

(71) Applicant: Panasonic Intellectual Property Management Co., Ltd., Osaka (JP)

(72) Inventors: Satoru Tamura, Chiba (JP); Marine Fayolle, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 102 days.

(21) Appl. No.: 16/423,219

(22) Filed: May 28, 2019

(65) Prior Publication Data

US 2019/0379068 A1  Dec. 12, 2019

(30) Foreign Application Priority Data

Jun. 12, 2018  (JP) .............................. JP2018-111810

(51) Int. Cl.
| | | |
|---|---|---|
| *H01M 8/18* | (2006.01) | |
| *H01M 8/04014* | (2016.01) | |
| *H01M 8/0612* | (2016.01) | |
| *H01M 8/10* | (2016.01) | |

(52) U.S. Cl.
CPC ..... *H01M 8/04022* (2013.01); *H01M 8/0618* (2013.01); *H01M 8/18* (2013.01); *H01M 2008/1095* (2013.01)

(58) Field of Classification Search
CPC .. H01M 8/04022; H01M 8/0618; H01M 8/18; H01M 8/0612; H01M 8/188; H01M 8/04186; H01M 8/04276; H01M 8/182; H01M 8/0432; H01M 8/04373; H01M 8/04738; H01M 2008/1095; H01M 2250/40; H01M 2250/405; F28D 2021/0043

See application file for complete search history.

(56) References Cited

U.S. PATENT DOCUMENTS

| | | | |
|---|---|---|---|
| 2007/0292729 A1* | 12/2007 | Brantley | .......... H01M 8/04268 429/423 |
| 2011/0014532 A1 | 1/2011 | Knuckey et al. | |
| 2017/0141425 A1* | 5/2017 | Katayama | ............. H01M 8/188 |

FOREIGN PATENT DOCUMENTS

| | | | | |
|---|---|---|---|---|
| JP | 2011-510466 | | 3/2011 | |
| WO | WO-2010128333 A1 | * | 11/2010 | ........ H01M 8/04276 |
| WO | WO-2018099993 A1 | * | 6/2018 | .......... H01M 8/0618 |

* cited by examiner

*Primary Examiner* — Milton I Cano
*Assistant Examiner* — Jenna Shulman
(74) *Attorney, Agent, or Firm* — McDermott Will & Emery LLP (57) ABSTRACT

A fuel cell system includes: a fuel cell that has a cathode and an anode and generates electricity by reducing a mediator at the cathode; a regenerator that oxidizes, with an oxidant, the mediator reduced by the cathode; a reformer; a combustor that heats the reformer; and a heating medium path that heats the regenerator, wherein through the heating medium path, combustion exhaust discharged from the combustor or a heat medium heated through heat exchange with the combustion exhaust flows.

6 Claims, 6 Drawing Sheets

FUEL CELL SYSTEM

BACKGROUND

1. Technical Field

The present disclosure relates to a fuel cell system.

2. Description of the Related Art

In a fuel cell in the related art, hydrogen is oxidized at the anode, and oxygen is reduced at the cathode. The cathodic reduction of oxygen proceeds slowly, and primarily because of this, fuel cells are not very efficient in terms of reaction rates. To address this drawback, redox-flow fuel cells are under development.

A redox-flow fuel cell is a fuel cell that includes a mediator for promoting at least one of the cathodic and anodic reactions. In an exemplary configuration of a redox-flow fuel cell, hydrogen gas is supplied to the anode, and a mediator solution is supplied to the cathode.

A system built with a redox-flow fuel cell usually has a regenerator for regenerating the mediator (Japanese Patent No. 5683963). The system regenerates the mediator at the regenerator and supplies the regenerated mediator to the cathode again so that the reactions in the fuel cell can occur repeatedly. For example, at the regenerator, chemical reaction between the reduced form of the mediator and oxygen is promoted through exposure of a mediator solution to air. In this way, the mediator is regenerated into its oxidized form.

SUMMARY

To improve the efficiency of a fuel cell system, it is important to accelerate the regeneration of the mediator at the regenerator.

One non-limiting and exemplary embodiment provides techniques for faster regeneration of a mediator.

In one general aspect, the techniques disclosed here feature a fuel cell system. The fuel cell system includes: a fuel cell that has a cathode and an anode and generates electricity by reducing a mediator at the cathode; a regenerator that oxidizes, with an oxidant, the mediator reduced by the cathode; a reformer; a combustor that heats the reformer; and a heating medium path that heats the regenerator, wherein through the heating medium path, combustion exhaust discharged from the combustor or a heat medium heated through heat exchange with the combustion exhaust flows.

The techniques according to the present disclosure enable faster regeneration of a mediator.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Underlying Knowledge Forming Basis of the Present Disclosure

To accelerate the regeneration of the mediator, the inventors assumed, it is important to maintain the regenerator at a predetermined temperature. Maintaining the regenerator at a predetermined temperature requires a technology that enables timely heating of the regenerator. After extensive research to develop such a technology, the inventors found it effective to heat the regenerator using combustion exhaust discharged from a combustor that heats a reformer. The fuel cell system according to the present disclosure is based on this new insight.

Overview of Aspects of the Disclosure

A fuel cell system includes: a fuel cell that has a cathode and an anode and generates electricity by reducing a mediator at the cathode; a regenerator that oxidizes, with an oxidant, the mediator reduced by the cathode; a reformer; a combustor that heats the reformer; and a heating medium path that heats the regenerator, wherein through the heating medium path, combustion exhaust discharged from the combustor or a heat medium heated through heat exchange with the combustion exhaust flows.

In the first aspect, the regenerator is maintained at a desired temperature because the regenerator is heated by virtue of the heating medium path. As a result, the regeneration of the mediator at the regenerator is accelerated. Moreover, it is possible to use combustion exhaust discharged from a combustor as a heat source for heating the regenerator.

In a second aspect of the present disclosure, for example, the heating medium path in the fuel cell system according to the first aspect may cover at least part of the regenerator. In the second aspect, heat radiated from the heating medium path, covering at least part of the regenerator, heats the regenerator efficiently, with little loss of thermal energy.

In a third aspect of the present disclosure, for example, the fuel cell system according to the second aspect may further include a component that is interposed between the heating medium path and the regenerator and transfers the heat of the combustion exhaust or heat medium in the heating medium path to the regenerator. In the third aspect, the interposed component ensures appropriate transfer of the heat of the combustion exhaust or heat medium to the regenerator. This prevents the deterioration of the mediator at the regenerator, thereby extending the service life of the fuel cell system.

In a fourth aspect of the present disclosure, for example, the fuel cell system according to any one of the first to third aspects may further include an oxidant feed path that is connected to the regenerator, wherein the oxidant to be supplied to the regenerator flows through the oxidant feed path; and a heat exchanger that exchanges heat between the combustion exhaust and the oxidant to be supplied to the regenerator. In the fourth aspect, the heat exchange between the combustion exhaust and the oxidant at the heat exchanger heats the oxidant. The cooling down of the mediator solution in the regenerator is limited because the oxidant has been heated when it is introduced into the regenerator. As a result, the regeneration of the mediator at the regenerator is accelerated.

In a fifth aspect of the present disclosure, for example, the heat exchanger in the fuel cell system according to the fourth aspect may heat the oxidant to be supplied to the regenerator with the combustion exhaust that has yet to heat the regenerator. In the fifth aspect, the heat exchange between the combustion exhaust and the oxidant at the heat exchanger cools the combustion exhaust. The combustion exhaust introduced into the heat exchanger is therefore hotter than that introduced into the heating medium path. The oxidant therefore tends to be supplied at an increased temperature to the regenerator, and this limits the cooling down that the oxidant causes to the mediator solution in the regenerator. As a result, the regeneration of the mediator at the regenerator is accelerated.

In a sixth aspect of the present disclosure, for example, the heat exchanger in the fuel cell system according to the fourth aspect may heat the oxidant to be supplied to the regenerator with the combustion exhaust that has already heated the regenerator. In the sixth aspect, the heat of the combustion exhaust that has heated the regenerator can be used to heat the oxidant. The cooling down of the mediator solution in the regenerator is limited because the oxidant has been heated when it is introduced into the regenerator. As a result, the regeneration of the mediator at the regenerator is accelerated.

The following describes embodiments of the present disclosure with reference to drawings. The present disclosure is not limited to these embodiments.

Embodiment 1

Figure 1:
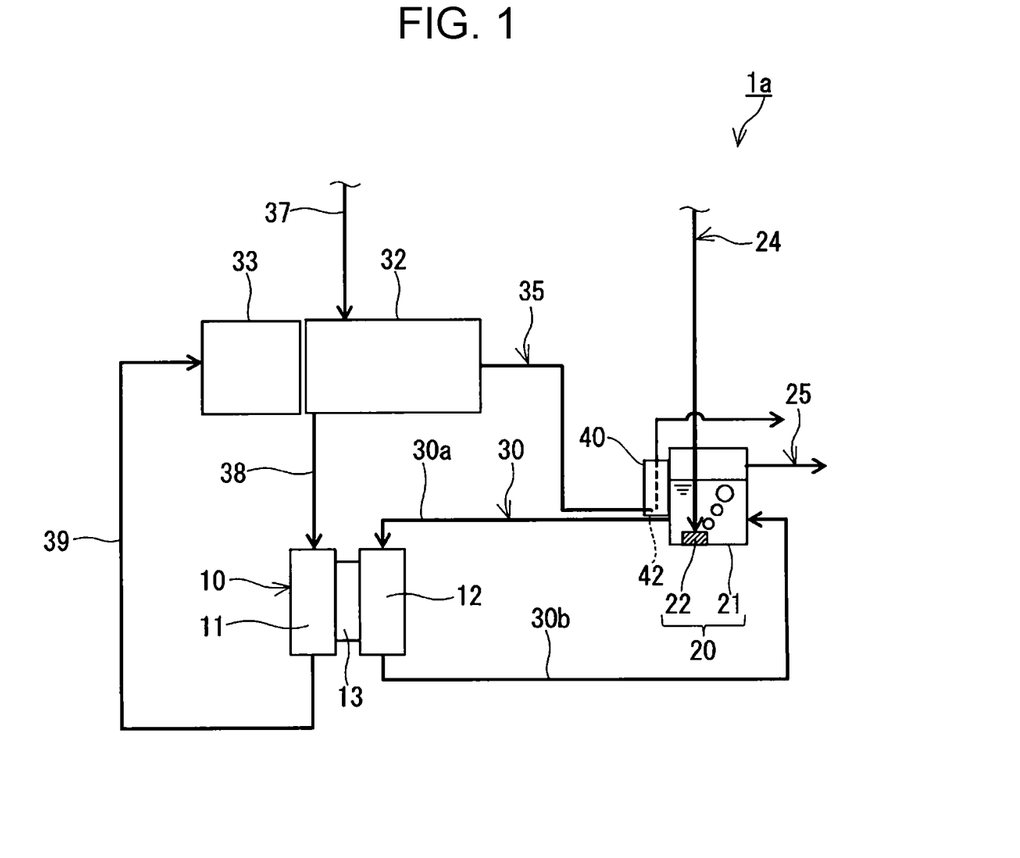
FIG. 1 illustrates the construction of a fuel cell system according to Embodiment 1 of the present disclosure.

FIG. 1 illustrates the construction of a fuel cell system according to Embodiment 1 of the present disclosure. The fuel cell system 1a includes a fuel cell 10, a regenerator 20, and a heating medium path 42. The heating medium path 42 forms at least part of a heater 40. The fuel cell 10 is a redox-flow fuel cell. The regenerator 20 is connected to the fuel cell 10 in such a manner that a mediator solution can circulate between the fuel cell 10 and the regenerator 20.

The fuel cell system 1a has several advantages, including reduced consumption of a costly noble-metal catalyst, highly efficient power generation owing to a smaller overvoltage, and a simpler cooling system by virtue of the use of a mediator solution.

The fuel cell 10 has an anode 11 (fuel electrode), a cathode 12 (oxidant electrode), and an electrolyte membrane 13. The electrolyte membrane 13 is between the anode 11 and the cathode 12. The anode 11, cathode 12, and electrolyte membrane 13 form a membrane electrode assembly. The fuel cell 10 may be a single cell or may be formed by a stack of multiple cells. The fuel cell 10 generates electricity by oxidizing fuel gas at the anode 11 and reducing a mediator at the cathode 12. The use of a mediator is not limited to the cathode 12; the reaction at the anode 11 may likewise involve a mediator.

The anode 11 is a porous electrode. The electrode is made of an electrically conductive material, such as a carbon material. Examples of carbon materials include glassy carbon, carbon nanotubes, and carbon felt. If the fuel gas is oxidized directly on the anode 11, the electrically conductive material carries, for example, a catalyst, such as platinum, thereon. If the reaction at the anode 11 involves a mediator, the catalyst can be omitted.

The cathode 12 is, for example, a porous substrate. A porous substrate that can be used as the anode 11 can also be used as the cathode 12. Since the fuel cell 10 performs the reaction at its cathode 12 using a mediator, the cathode 12 requires no catalyst, such as platinum. The cathode 12, however, may have a catalyst.

The electrolyte membrane 13 is a membrane that conducts protons. The material for the electrolyte membrane 13 is not critical. To name a few, the electrolyte membrane 13 can be a fluoropolymer or hydrocarbon-polymer electrolyte membrane. An exemplary fluoropolymer electrolyte membrane is one made from a perfluorosulfonic acid polymer, such as Nafion® (DuPont). An exemplary hydrocarbon-polymer electrolyte membrane is one made with a hydrocarbon polymer that has protonic acid groups (groups that conduct protons) introduced thereto. The hydrocarbon polymer can be, for example, an engineering or general-purpose plastic. Examples of engineering plastics include polyether ether ketone, polyether ketone, polyether sulfone, polyphenylene sulfide, polyphenylene ether, and polyparaphenylene. Examples of general-purpose plastics include polyethylene, polypropylene, and polystyrene. The protonic acid groups can be, for example, sulfonic acid, carboxylic acid, phosphoric acid, or boronic acid groups.

The regenerator 20 is, for example, a container 21. The regenerator 20 oxidizes the mediator. The container 21 has an inner space in which the mediator solution can be retained. The container 21 may be thermally insulating.

The regenerator 20 may include a bubbler 22. The bubbler 22 helps an oxidant come into contact with the mediator solution by producing tiny bubbles of the oxidant. The bubbler 22 is inside the container 21. In this embodiment, the bubbler 22 is on the bottom of the container 21. To the bubbler 22, an oxidant is supplied from the outside. The oxidant is blown out of the bubbler 22 and rises in the mediator solution while touching it. As a result, the mediator is oxidized. In this embodiment, the oxidant is a gas. Typically, the oxidant is atmospheric oxygen (oxygen gas).

The mediator solution contains a mediator and a solvent. Any kind of mediator can be used. To name a few, the mediator can be a polyoxometalate, metal ions, or a metal complex. Polyoxometalates that can be used include phosphomolybdic acid, phosphovanadic acid, and phosphotungstic acid, and metals polyoxometalates can have include vanadium, molybdenum, and tungsten. Examples of metal complexes include porphyrin metal complexes, TEMPO (2,2,6,6-tetramethylpiperidine 1-oxyl)-coordinated metal complexes, and metal complexes coordinated by an oxidase or its derivative. The oxidase can be, to name a few, galactose oxidase, bilirubin oxidase, or glucose oxidase. The mediator solution may contain multiple mediators. The solvent, too, can be of any kind. To name a few, the solvent can be water, aqueous sulfuric acid, or aqueous phosphoric acid. The pH of the solution may be acidic. The mediator solution may contain an appropriate electrolyte.

The concentration of the mediator in the mediator solution has been adjusted to an appropriate level so that the reaction at the cathode 12 will proceed smoothly. The concentration of the mediator can be adjusted in accordance with the kind of mediator. If the mediator solution is an aqueous solution of a polyoxometalate (POM), the concentration of the POM in the aqueous solution is, for example, 0.05 mol/liter or more or may even be 0.1 mol/liter or more.

The fuel cell system 1a further includes an oxidant feed path 24. The oxidant feed path 24 is connected to the regenerator 20. To be more specific, the oxidant feed path 24 is connected to the bubbler 22 of the regenerator 20. Through the oxidant feed path 24, the oxidant to be supplied to the mediator at the regenerator 20 flows. The oxidant feed path 24 may be equipped with a fan, blower, or any other oxidant feeder so that the oxidant can be blown into the mediator solution.

The fuel cell system 1a further includes a circulation path 30. The circulation path 30 connects the fuel cell 10 and the regenerator 20. Through the circulation path 30, the mediator solution can circulate between the cathode 12 of the fuel cell 10 and the regenerator 20. To be more specific, the circulation path 30 allows the mediator reduced at the cathode 12 to be oxidized at the regenerator 20 and supplied to the cathode 12 again. This ensures the reaction at the cathode 12 proceeds smoothly.

In this embodiment, the circulation path 30 has a first path 30a and a second path 30b. The first path 30a connects the solution outlet of the regenerator 20 and the entry to the cathode 12. The second path 30b connects the exit from the cathode 12 and the solution inlet of the regenerator 20. The circulation path 30 may be equipped with a pump. The pump may be in the first path 30a or may be in the second path 30b. There may even be a pump in the first path 30a and another in the second path 30b.

Each of the first and second paths 30a and 30b of the circulation path 30 can be at least one pipe. There may be components other than a pump along the circulation path 30, such as connectors, filters, valves, flowmeters, and sensors. These also apply to other paths.

The fuel cell system 1a further includes a reformer 32. The reformer 32 produces, for example, a hydrogen-containing gas through a reforming reaction, such as steam reforming ($CH_4+H_2O \rightarrow 3H_2+CO$). The reformer 32 contains a reforming catalyst, a catalyst for promoting the reforming reaction. The reformer 32 may contain a catalyst for removing carbon monoxide (catalyst for converting or selectively oxidizing CO). The reformer 32 produces a hydrogen-containing gas from steam and raw-material gas. The raw-material gas is, for example, a hydrocarbon gas, such as town gas or liquefied petroleum (LP) gas. The hydrogen-containing gas is supplied to the fuel cell 10 as fuel gas.

The fuel cell system 1a further includes a combustor 33 and a gas exhaust path 35. The combustor 33 heats the reformer 32 by burning an inflammable gas. The combustor 33 is adjacent to the reformer 32. The combustor 33 may alternatively be inside the reformer 32. The gas exhaust path 35 is connected to the combustor 33. Through the gas exhaust path 35, the combustion exhaust produced at the combustor 33 flows. The gas exhaust path 35 extends, for example, to the outside of the enclosure of the fuel cell system 1a.

The heating medium path 42 is placed to heat the regenerator 20. Through the heating medium path 42, combustion exhaust discharged from the combustor 33 flows. The regenerator 20 is therefore heated by the heat radiated from the heating medium path 42. As a result, the inside of the regenerator 20 is maintained at a desired temperature, ensuring fast regeneration of the mediator. The heating medium path 42 is, for example, part of the gas exhaust path 35.

Figure 2:
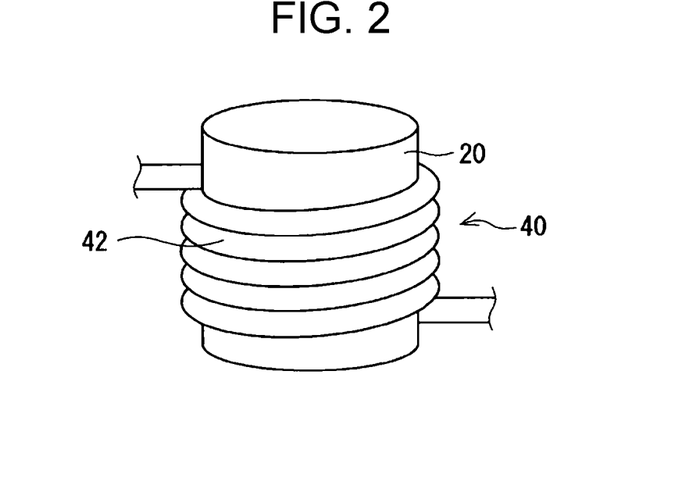
FIG. 2 schematically illustrates an example of a heater.

The heating medium path 42 covers, for example, at least part of the regenerator 20. Here, the forms of covering contemplated by the verb "cover" can include putting the component(s) that forms the heating medium path 42 directly on the regenerator 20 and covering the regenerator 20 with the component(s) that forms the heating medium path 42 with a space or a certain material interposed therebetween. As illustrated in FIG. 2, the heating medium path 42 is, for example, a pipe coiled around the regenerator 20. This pipe is typically made of a material that conducts heat well. The heating medium path 42 may alternatively be a jacket (not illustrated) surrounding at least part of the regenerator 20. In this case, the jacket has an inlet and an outlet for the combustion exhaust.

At least part of the heating medium path 42 may be covered with a thermal insulator. The thermal insulator can be made of, to name a few, resin, metal, glass, or a ceramic material. The form of the thermal insulator is not critical either. Examples of forms of the thermal insulator include a piece of foam and a mass of fiber. The thermal insulator may alternatively be a hollow material that provides an air space.

The fuel cell system 1a further includes, for example, a gas discharge path 25. The gas discharge path 25 is connected to the regenerator 20. The gas discharge path 25 opens, for example, into the space inside the regenerator 20 at a position higher than the surface of the mediator solution. While the oxidation of the mediator can produce water, the regenerator 20 is heated by the heater 40. Part of the water produced with the oxidation of the mediator therefore evaporates into steam. The resulting steam is discharged out of the regenerator 20 through the gas discharge path 25. At the regenerator 20, therefore, the dilution of the mediator in the mediator solution is limited. Through the gas discharge path 25, unreacted oxidant may also be discharged out of the regenerator 20.

At least part of the heating medium path 42 is positioned, for example, higher than the surface of the mediator solution in the regenerator 20. This means the gas present inside the regenerator 20 is also heated by the heater 40. The steam inside the regenerator 20 therefore tends to be discharged out of the regenerator 20 rather than condensing.

Figure 3:
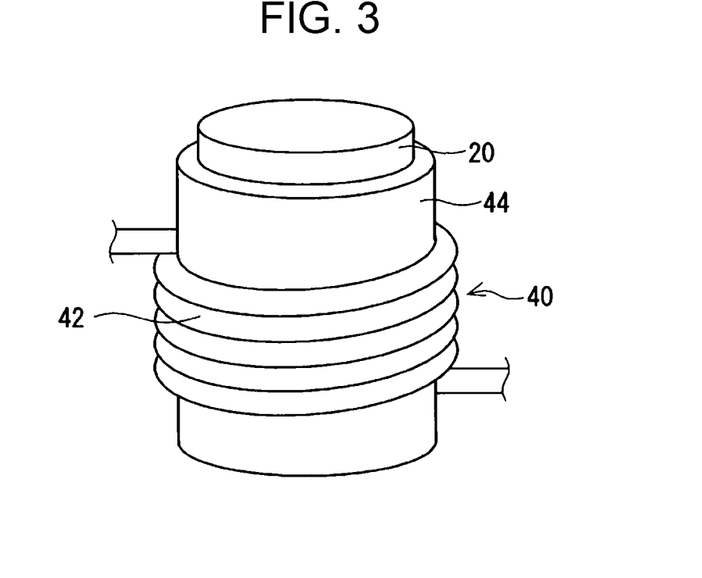
FIG. 3 schematically illustrates another example of a heater.

As illustrated in FIG. 3, the fuel cell system 1a may further include a component 44 interposed between the heating medium path 42 and the regenerator 20. The component 44 transfers the heat of the combustion exhaust in the heating medium path 42 to the regenerator 20. The component 44 is, for example, intended to fill the space between the heating medium path 42 and the regenerator 20 with at least one selected from a solid and a fluid. The interposed component 44 ensures appropriate transfer of the heat of the combustion exhaust to the regenerator 20. For example, if the combustion exhaust is too hot to be used to heat the regenerator 20, the component 44 provides a way to control the outer surface of the regenerator 20 to a desired temperature. Appropriate heat transfer prevents the deterioration of the mediator at the regenerator 20, thereby extending the service life of the fuel cell system 1a.

The component 44 is, for example, a jacket surrounding at least part of the regenerator 20, and there is a predetermined liquid inside the jacket. The liquid has a boiling point selected as a temperature at which, for example, the mediator in the regenerator 20 does not deteriorate. Even if the combustion exhaust is hotter than the boiling point of the liquid, therefore, the outer surface of the regenerator 20 tends to be maintained at temperatures at which the mediator does not deteriorate. Any kind of liquid can be used as the liquid inside the component 44. An example is water.

The fuel cell system 1a further includes a raw-material gas feed path 37, a fuel gas feed path 38, and an anode gas discharge path 39. Through the raw-material gas feed path 37, raw-material gas is supplied from a storage tank, town-gas infrastructure, or any other source of the raw material (not illustrated) to the reformer 32. Through the fuel gas feed path 38, a hydrogen-containing gas is supplied from the reformer 32 to the fuel cell 10. The fuel gas feed path 38 connects the reformer 32 and the fuel cell 10. Through the anode gas discharge path 39, unreacted residue of the hydrogen-containing gas is discharged from the anode 11 of the fuel cell 10. The anode gas discharge path 39 connects the anode gas outlet of the fuel cell 10 and the combustor 33. The unreacted hydrogen-containing gas is supplied to the combustor 33 through the anode gas discharge path 39. The combustor 33 heats the reformer 32 by burning the hydrogen-containing gas.

The following describes some other embodiments. Any element in common with Embodiment 1 is referenced by the same designator as in Embodiment 1 without repeated description. Descriptions may be true across different embodiments unless technically contradictory. Different embodiments may be combined unless technically contradictory.

Embodiment 2

Figure 4:
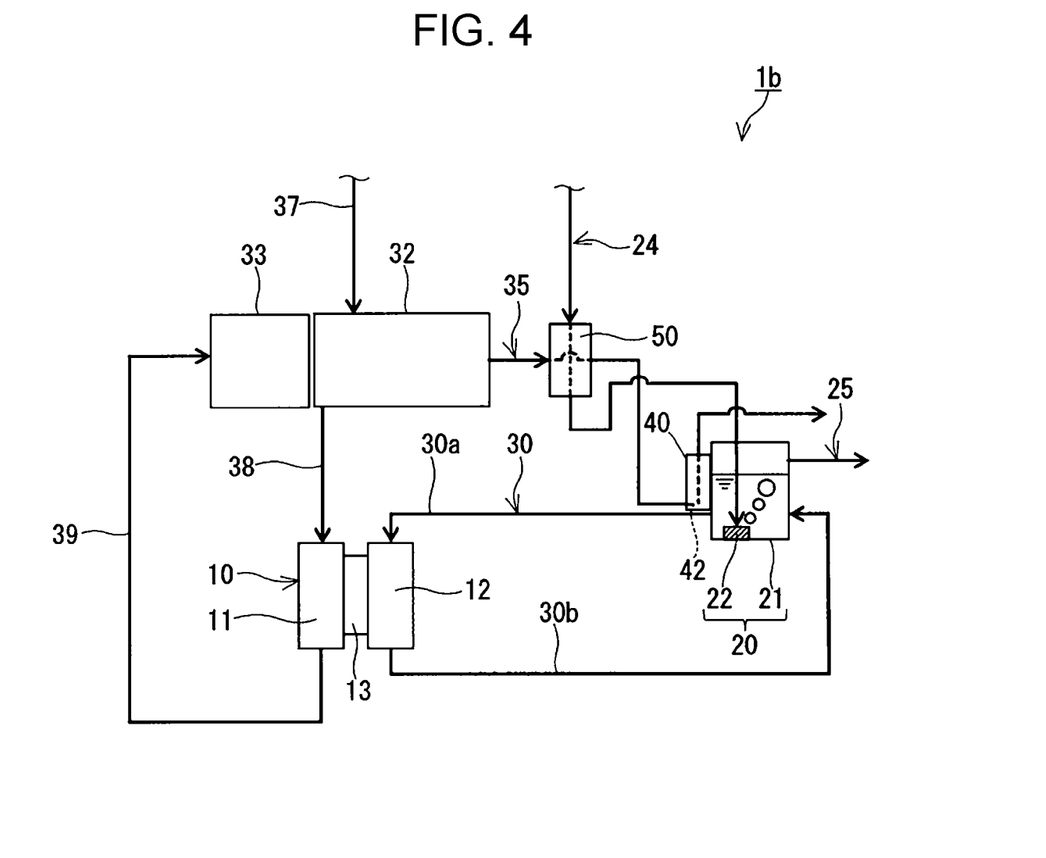
FIG. 4 illustrates the construction of a fuel cell system according to Embodiment 2 of the present disclosure.

FIG. 4 illustrates the construction of a fuel cell system according to Embodiment 2 of the present disclosure. As illustrated in FIG. 4, the fuel cell system 1b further includes, for example, a heat exchanger 50. The heat exchanger 50 exchanges heat between the combustion exhaust discharged from the combustor 33 and the oxidant to be supplied to the regenerator 20. The oxidant to be supplied to the regenerator 20 is heated by the combustion exhaust. The heat exchanger 50 is in the oxidant feed path 24. To be more specific, the heat exchanger 50 is in the oxidant feed path 24 and the gas exhaust path 35. The heat exchanger 50 forms part of the oxidant feed path 24, and also forms part of the gas exhaust path 35.

The heat exchanger 50 transfers the heat of the combustion exhaust discharged from the combustor 33 to the oxidant to be supplied to the regenerator 20. Heating the oxidant before introducing it into the regenerator 20 will limit the cooling down of the mediator solution in the regenerator 20, or may even warm up the mediator solution by virtue of the sensible heat of the oxidant. As a result, the regeneration of the mediator at the regenerator 20 is accelerated.

The structure of the heat exchanger 50 is not critical as long as the heat exchanger 50 is capable of heat exchange between the combustion exhaust and the oxidant. Examples of heat exchangers that can be used as the heat exchanger 50 include a shell-and-tube heat exchanger, a plate heat exchanger, a fin-and-tube heat exchanger, and a double-pipe heat exchanger. In certain configurations, the piping forming the oxidant feed path 24 may be in contact with that forming the gas exhaust path 35, whether directly or with another component therebetween, or the piping forming the oxidant feed path 24 may be positioned near that forming the gas exhaust path 35. Such cases can be understood as the formation of the heat exchanger 50 by the piping forming the oxidant feed path 24 and that forming the gas exhaust path 35.

As illustrated in FIG. 4, the heat exchanger 50 heats the oxidant to be supplied to the regenerator 20 with the combustion exhaust that has yet to heat the regenerator 20. For example, the heat exchanger 50 is upstream of the heating medium path 42 in the gas exhaust path 35. In this case, the combustion exhaust introduced into the heat exchanger 50 is hotter than that introduced into the heater 40. This helps the oxidant to be supplied at an increased temperature to the regenerator 20, thereby limiting the cooling down that the oxidant causes to the mediator solution in the regenerator 20. In certain configurations, the oxidant may be oxygen in external air. In the fuel cell system 1b, the heat exchanger 50 helps heat the oxidant to be supplied to the regenerator 20 to a desired temperature, even in the event of a low external temperature in winter.

Embodiment 3

Figure 5:
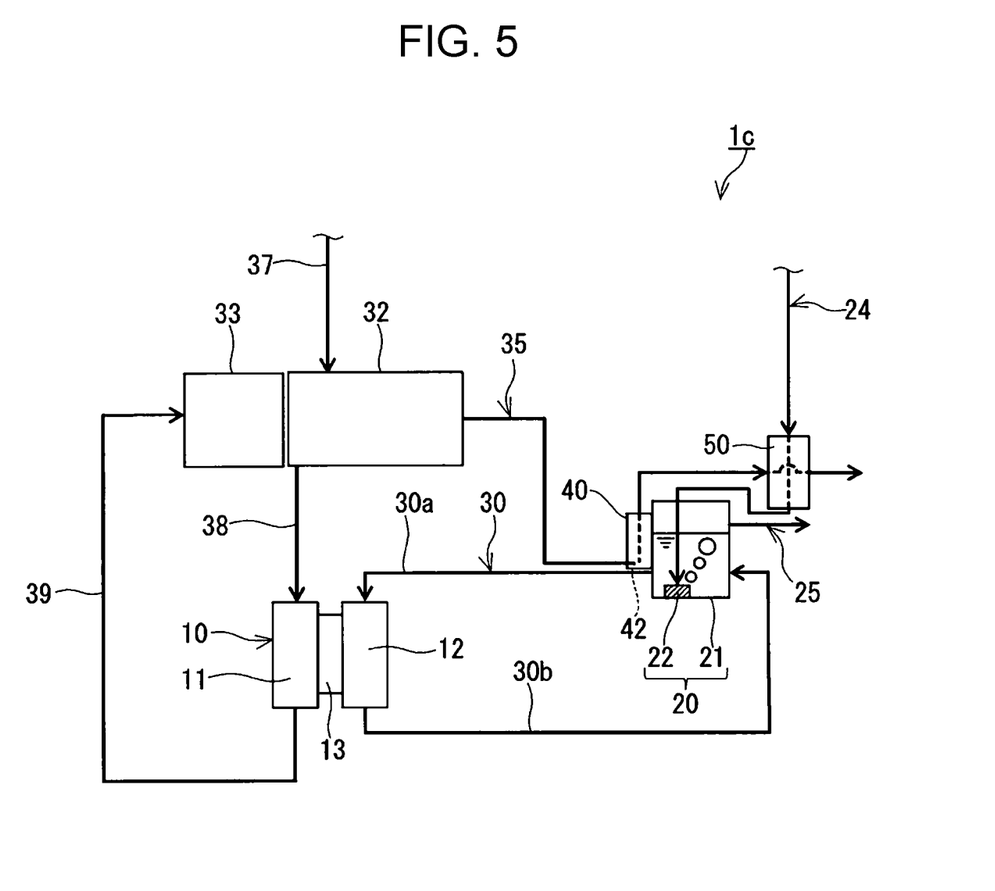
FIG. 5 illustrates the construction of a fuel cell system according to Embodiment 3 of the present disclosure.

FIG. 5 illustrates the construction of a fuel cell system according to Embodiment 3 of the present disclosure. Unless otherwise specified, the construction of the fuel cell system 1c is the same as that of the fuel cell system 1b. The heat exchanger 50 heats the oxidant to be supplied to the regenerator 20 with the combustion exhaust that has already heated the regenerator 20. For example, the heat exchanger 50 is downstream of the heating medium path 42 in the gas exhaust path 35. This allows the heat of the combustion exhaust past the heater 40 to be used to heat the oxidant. The cooling down of the mediator solution in the regenerator 20 is limited because the oxidant has been heated when it is introduced into the regenerator 20. As a result, the regeneration of the mediator at the regenerator 20 is accelerated.

Embodiment 4

Figure 6:
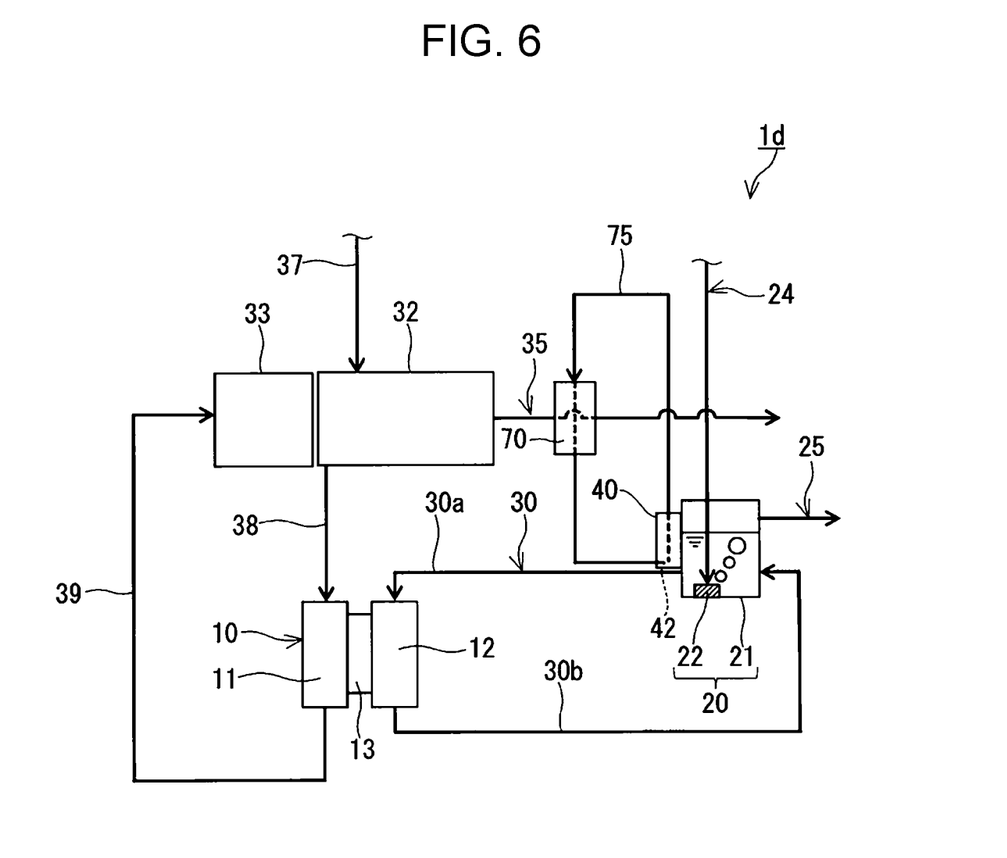
FIG. 6 illustrates the construction of a fuel cell system according to Embodiment 4 of the present disclosure.

FIG. 6 illustrates the construction of a fuel cell system according to Embodiment 4 of the present disclosure. In the fuel cell system 1d, what flows through the heating medium path 42 is a heat medium heated through heat exchange with combustion exhaust. The fuel cell system 1d includes, for example, a heat exchanger 70 and a heat medium path 75. The heat exchanger 70 exchanges heat between the combustion exhaust discharged from the combustor 33 and the heat medium. The heat medium does not need to be a particular substance. The heat medium contains, for example, water. The heat medium path 75 connects the heat exchanger 70 and the heater 40 and allows the heat medium to circulate between the heat exchanger 70 and the heater 40. Part of the heat medium path 75 forms the heating medium path 42, and the heat exchanger 70 forms part of the gas exhaust path 35. At the heat exchanger 70, heat exchange between the combustion exhaust and the heat medium heats the heat medium. The heat medium discharged from the heat exchanger 70 is introduced into the heating medium path 42. The heat of the heat medium in the heating medium path 42 can be used to heat the regenerator 20.

Examples of heat exchangers that can be used as the heat exchanger 70 include a shell-and-tube heat exchanger, a plate heat exchanger, a fin-and-tube heat exchanger, and a double-pipe heat exchanger. In certain configurations, the piping forming the heat medium path 75 may be in contact with that forming the gas exhaust path 35, whether directly or with another component therebetween, or the piping forming the heat medium path 75 may be positioned near that forming the gas exhaust path 35. Such cases can be understood as the formation of the heat exchanger 70 by the piping forming the heat medium path 75 and that forming the gas exhaust path 35.

The heat medium path 75 may extend without the heat medium outlet of the heater 40 connected to the heat exchanger 70.

Embodiment 5

Figure 7:
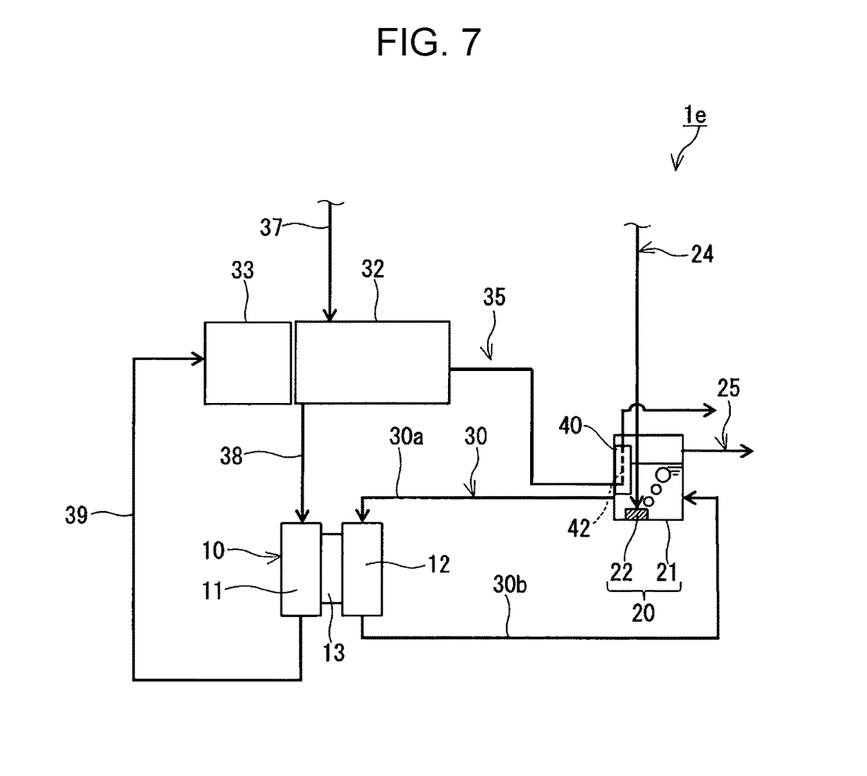
FIG. 7 illustrates the construction of a fuel cell system according to Embodiment 5 of the present disclosure.

FIG. 7 illustrates the construction of a fuel cell system according to Embodiment 5 of the present disclosure. In the fuel cell system 1e, the heating medium path 42 is located, for example, inside the regenerator 20. In the fuel cell system 1e, the heater 40 heats the inside of the regenerator 20 efficiently, with little heat loss.

Other Variations

Figure 8:
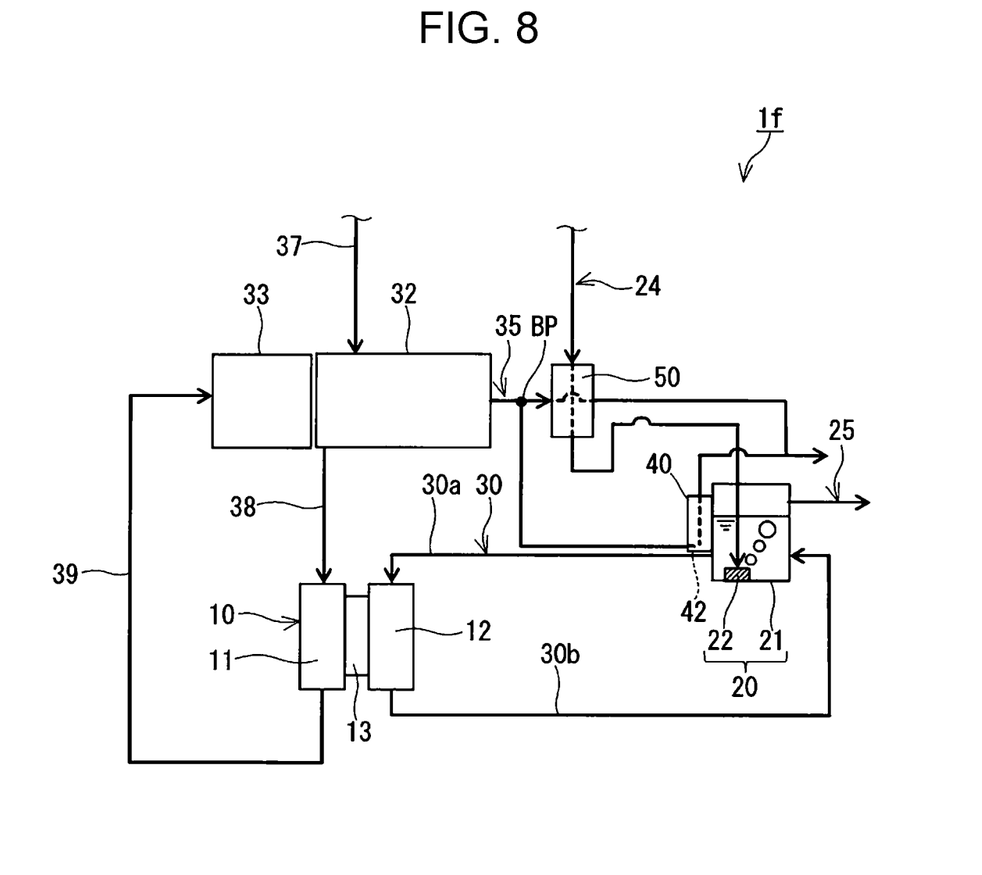
FIG. 8 illustrates the construction of a fuel cell system according to a variation.

The fuel cell system 1b or 1c may be modified to split the gas exhaust path 35 upstream of the heat exchanger 50 and the heating medium path 42. For example, the fuel cell system 1b or 1c may be modified as in the fuel cell system 1f illustrated in FIG. 8. In the fuel cell system 1f, the gas exhaust path 35 has a branching point BP, and the heat exchanger 50 is connected to the branching point BP by a different passage than the heating medium path 42. In other words, the heat exchanger 50 and the heating medium path 42 are in parallel arrangement in the gas exhaust path 35. This makes it possible to control the ratio of the flow rate of the combustion exhaust supplied to the heat exchanger 50 to that of the combustion exhaust supplied to the heating medium path 42, for example in accordance with the operating conditions for the fuel cell system 1f. The gas exhaust path 35 is optionally equipped with a valve for controlling this ratio.

The fuel cell system 1b or 1c may be modified so that the direction of flow of the combustion exhaust between the heat exchanger 50 and the heating medium path 42 can be switched. This allows the fuel cell system to switch between two modes in accordance with its operating conditions: a first mode in which the combustion exhaust passes through the heat exchanger 50 and then is supplied to the heating medium path 42, and a second mode in which the combustion exhaust passes through the heating medium path 42 and then is supplied to the heat exchanger 50. In this variation, it is not critical how the system switches between the first and second modes. An exemplary mechanism that enables the system to switch between the first and second modes is a gas exhaust path 35 that includes two detour paths bypassing the heat exchanger 50 and the heating medium path 42 with a three-way valve at both ends of each detour path.

The fuel cell system 1d may be modified to further include the heat exchanger 50. In this case, the heat exchanger 50 may be upstream of the heat exchanger 70 in the gas exhaust path 35 or may be downstream of the heat exchanger 70.

The techniques disclosed herein are useful in fuel cell systems.

What is claimed is:

1. A fuel cell system comprising:
    a fuel cell that has a cathode and an anode and generates electricity by reducing a mediator at the cathode;
    a regenerator that oxidizes, with an oxidant, the mediator reduced by the cathode;
    a reformer;
    a combustor that heats the reformer;
    a heating medium path that heats the regenerator,
        wherein through the heating medium path, combustion exhaust discharged from the combustor or a heat medium heated through heat exchange with the combustion exhaust flows; and
    a heat exchanger arranged external to the regenerator and the reformer and arranged in an oxidant feed path connected to the regenerator and a gas exhaust path connected to the reformer, wherein the heat exchanger receives the combustion exhaust from the combustor via the gas exhaust path and exchanges heat between the combustion exhaust received via the gas exhaust path and the oxidant supplied to the regenerator via the oxidant feed path.

2. The fuel cell system according to claim 1, wherein the heating medium path covers at least part of the regenerator.

3. The fuel cell system according to claim 2, further comprising a component that is interposed between the heating medium path and the regenerator and transfers heat of the combustion exhaust or heat medium in the heating medium path to the regenerator.

4. The fuel cell system according to claim 1, wherein the heat exchanger heats the oxidant to be supplied to the regenerator with the combustion exhaust that has yet to heat the regenerator.

5. The fuel cell system according to claim 1, wherein the heat exchanger heats the oxidant to be supplied to the regenerator with the combustion exhaust that has already heated the regenerator.

6. The fuel cell system according to claim 1, wherein the mediator is a polyoxometalate, metal ions, or a metal complex.

* * * * *